Sept. 3, 1935.                M. A. LACEY                2,013,388
                         AUTOMATIC GEAR SHIFTER
                         Filed Sept. 8, 1931          2 Sheets-Sheet 1

INVENTOR
Maurice A. Lacey
BY
ATTORNEYS

Sept. 3, 1935.                 M. A. LACEY                    2,013,388
                           AUTOMATIC GEAR SHIFTER
                            Filed Sept. 8, 1931              2 Sheets-Sheet 2
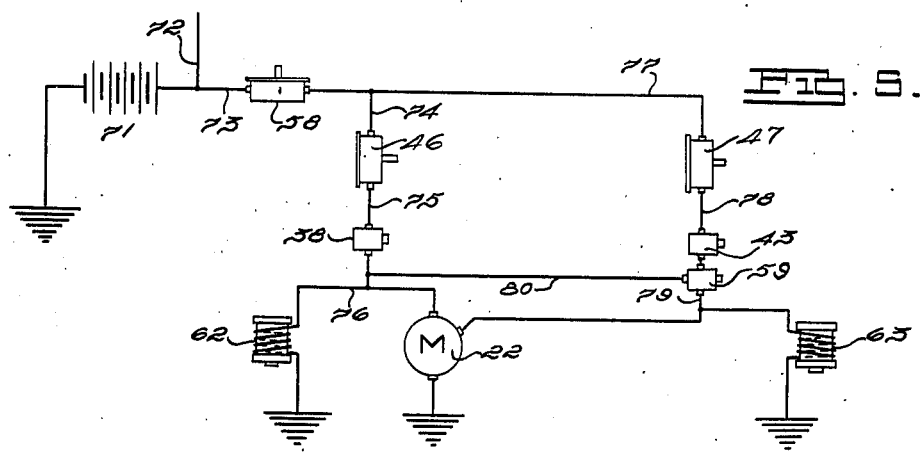
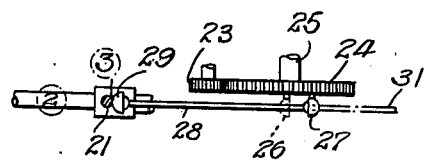
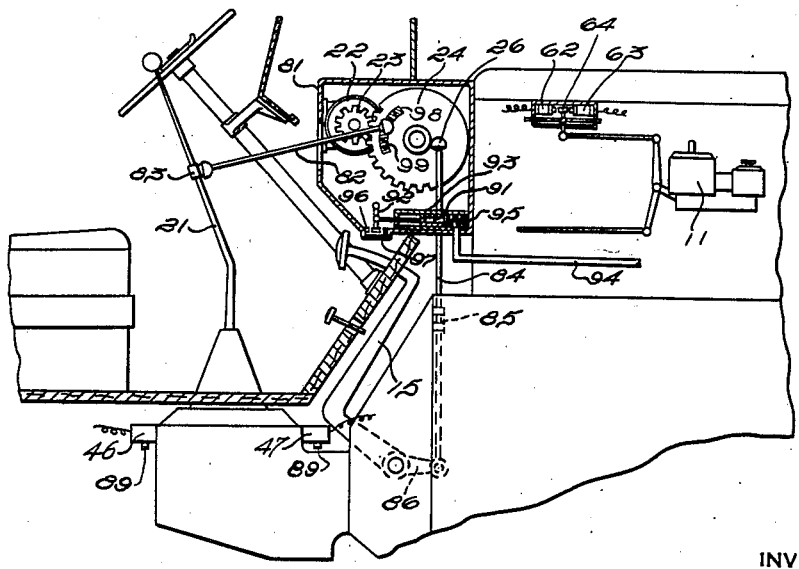
INVENTOR
Maurice A. Lacey
BY
ATTORNEYS.

Patented Sept. 3, 1935

2,013,388

UNITED STATES PATENT OFFICE 2,013,388

AUTOMATIC GEAR SHIFTER

Maurice A. Lacey, Highland Park, Mich.

Application September 8, 1931, Serial No. 561,571

12 Claims. (Cl. 74—335)

My invention relates to automatic gear shifting devices and particularly to a device for automatically shifting the gears of the transmission of an automotive vehicle in accordance with the variations occurring between the tractive load of the vehicle and the engine power.

The main objects of my invention are: to provide a device which is responsive to the change in pressure on the suction side of the engine, for actuating switch contacts for completing a circuit to the gear shifting motor; of providing timing means for delaying the actuation of the device in either direction for preventing the closing or opening of the switch within a predetermined time limit; of providing a mechanism which is operated by a motor for releasing the clutch of the automotive vehicle, for shifting the gears and for thereafter permitting the clutch to be engaged each time the motor is energized; to provide suitable switches associated with the transmission mechanism for deenergizing the motor at the end of the shift stroke; of providing means for controlling the throttle of the engine at the time the shift is made, to permit the gears to be engaged without clashing; and, in general, to provide a structure whereby after the vehicle has been started in low gear, the complete actuation of the clutch and transmission through low and intermediate speeds to high speed will be automatically effected without any assistance from the vehicle operator. Thereafter the mechanism will be available to automatically shift from high to second speed and back to high speed in accordance with the power demanded of the engine.

Other objects and features of novelty of my invention will be either specifically pointed out or will become apparent when referring, for a better understanding of my invention, to the following description in conjunction with the accompanying drawings, wherein:

Fig. 5 is a wiring diagram of the control system employed in connection with the structure embodying my invention;

Fig. 6 is a broken sectional view of my invention illustrated as an accessory which may be attached to an automotive vehicle, and Fig. 7 is a plan view of the structure illustrated in Fig. 2.

Figure 1:
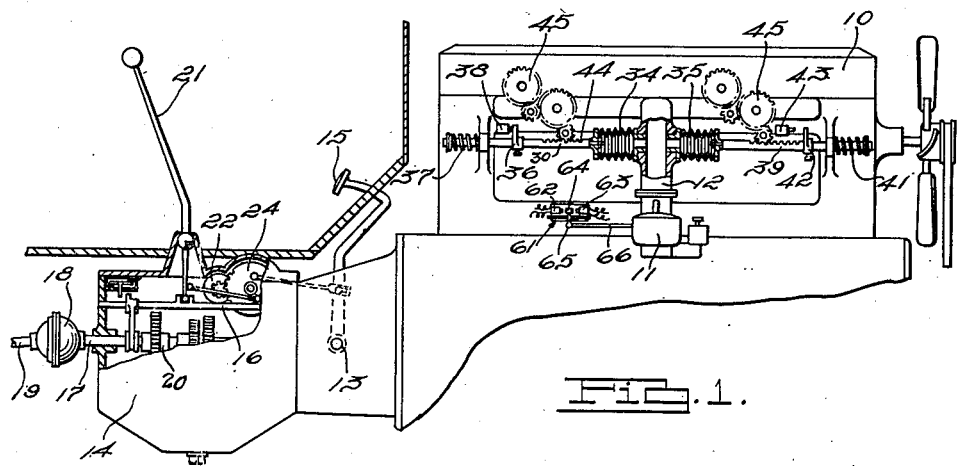
Figure 1 is a broken view, in elevation, of an automotive vehicle, engine and transmission embodying features of my invention.

Referring to Fig. 1, I have illustrated an automotive engine 10 provided with a carburetor 11 attached to an intake manifold 12 all of which are conventionally employed in the art. Rearwardly of the engine 10 a clutch 13 is provided, which is disposed between the engine and a transmission 14 in the conventional manner and which is actuated by a clutch lever 15 for disconnecting the engine from the transmission. The transmission 14 is of the conventional type, being provided with a plurality of gears 20 and shift rods 16, the latter of which actuate the gears into meshed relation to effect the low, intermediate and high speeds, as is well known in the art. The driven shaft 17 of the transmission is connected through a universal joint 18 to the propeller shaft 19 in a well known manner. The propeller shaft is connected through a differential (not shown) for driving the rear wheels of an automobile. While I specify that the rear wheels are to be driven by the propeller shaft, my invention is not limited to any particular drive, but will operate successfully on any type of drive whether front, rear or on all of the vehicle wheels. The shift rods 16 are operated in the conventional manner by a shift lever 21.

Figure 2:
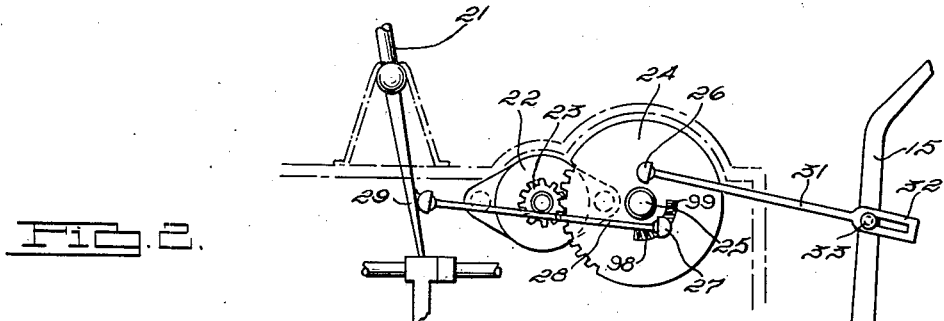
Fig. 2 is an enlarged broken view of a portion of the structure illustrated in Fig. 1.

In Fig. 2, it will be noted that within the transmission housing I have provided an electric motor 22 having a gear 23 on its rotatable shaft in mesh with a gear or sector 24 which is mounted on a shaft 25. Eccentric to the shaft 25 are pivots 26 and 27 which are relatively spaced a predetermined distance from the center of the shaft 25, as illustrated in the figure. A link 28 connects the pivot 27 to the end of the shift lever 21 through a ball and socket connection 29 which permits the transverse movement of the shift lever 21, in view of the off-center position of the gears 23 and 24 with the lever, as illustrated more clearly in Fig. 7. The pivot 26 supports one end of a link 31, the other end of which is slotted at 32 and employed for spanning a pin 33 provided on the clutch shift lever 15. In this construction the clutch lever is operable independently of the link 31 and gear 24 and at the same time may be operated through the gear 24 by the motor 22. The gear 24 is rotated continuously through substantially one hundred and sixty degrees, the first eighty degree movement actuating the lever 15 to release the clutch and shifting the lever 21, after which the further eighty degree movement of the gear 24 causes the lever 31 to be retrieved to permit the lever 15 to return to clutch engaged position. This further movement does not retrieve the link 28 but only moves the pivot 27 from a position below the shaft 25 to a position above the shaft, permitted by the springs 98 and 99.

Referring to Fig. 1, I have illustrated each side of the intake manifold 12 as being connected to bellows or sylphons 34 and 35 which are subjected to changes in pressure within the intake manifold. The bellows 34 is connected to a rod 30 which is provided with a switch actuation arm 36 and a spring 37 for effecting the movement of the rod to the left when viewed in Fig. 1 upon a decrease in suction pressure within the intake manifold. A switch 38 is in position in the path of movement of the arm 36 to be actuated when the rod is moved to the left which, as pointed out above, is effected by a decrease in suction pressure.

The bellows 35, on the right hand side of the engine as viewed in Fig. 1, is connected to a rod 39 which is moved to the right by a spring 41 upon a decrease in pressure within the intake manifold 12, which movement moves a switch actuating arm 42 out of contact with a switch 43 to thereby open a circuit. The rods 30 and 39 are provided with racks 44 which are in engagement with a gear train 45, the purpose of which will be explained hereinafter.

Figure 3:
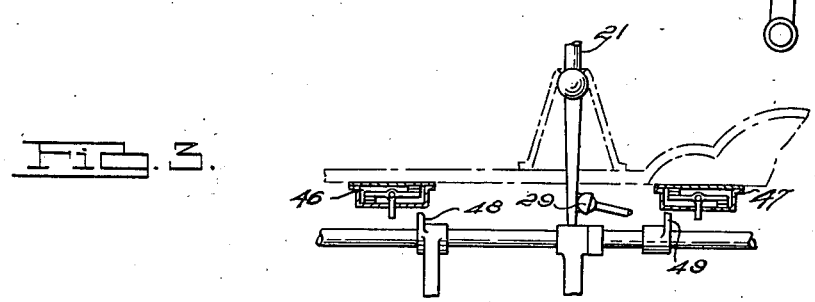
Fig. 3 is an enlarged broken view of another portion of the structure illustrated in Fig. 1.

Referring to Fig. 3, I have illustrated a pair of switches 46 and 47 which are actuated by fingers 48 and 49, respectively, mounted on the shift rod 16 which controls the movement of the gears into second and high speed. When the rod is shifted to the left to connect the second speed gears, to actuate the vehicle at intermediate speed, the finger 48 engages the switch 46 to open the switch at the very end of its stroke for a purpose which will be explained hereinafter. In like manner when the rod is shifted forwardly, or to the right as viewed in Fig. 1, the switch 47 is engaged by the finger 49 at the end of the stroke for opening the switch and breaking the circuit to the driving motor. Suitable springs are provided in the switches for returning the switch blades to closed circuit position after the fingers 48 and 49 have been moved out of contact with the actuating arms of the switches.

Figure 4:
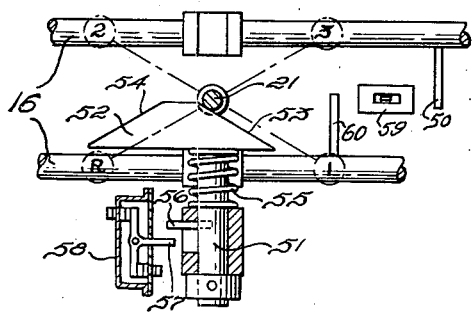
Fig. 4 is an enlarged plan view, partly in section, of a portion of a transmission mechanism embodying a feature of my invention.

In Fig. 4, I have illustrated an attachment which I prefer to provide adjacent to the shift rod in order to have the shift lever guided from its position in low speed through neutral into second speed, to prevent it from being accidentally shifted to the reverse speed when automatically shifted from the low speed position. The shift rods 16 are positioned on each side of the lower end of the shift lever 21 and the numerals 1, 2 and 3 are employed for indicating the first, intermediate and high speeds while the letter R is employed for indicating the reverse speed position. A plunger 51 carries a member 52 having sloping sides 53 and 54 which are positioned, respectively, adjacent to the path of movement of the shift lever when moved from first to intermediate speed and positioned directly in the path of movement of the lever when moved from neutral to reverse speed. A spring 55 is provided about the plunger 51 for biasing it forwardly to the position illustrated in the figure. An arm 56 is provided on the plunger 51 for the purpose of engaging the actuating arm 57 of a switch 58 for opening the switch when the shift rod is moved into reverse position. The blade of the switch is spring actuated and returns to closed circuit position when the switch arm 57 is released by the arm 56 after the shift rod has been moved from reverse position. The purpose of the member 52 is to automatically guide the movement of the shift lever from low speed past neutral into second speed and to actuate the cutout switch 58 to disconnect the automatic shift circuit and prevent it from operating while the shift lever is in reverse position.

In the transmission mechanism provided on automotive vehicles today, the shift lever can only be moved laterally from engagement with the low and reverse shift rod, to the second and high shift rod, or vice versa, at the neutral position of the shift lever 21. Accordingly the slope 53 on the plate 52 is such as to cause a movement of the plate 52 against the bias of the spring 55, when initially shifting from a low position, which bias is available to force the shift lever laterally from the low shift rod to the second speed shift rod at the neutral position of the lever 21, during its movement. To effect a greater movement to the plate 52, to operate the switch 58 only when the lever 21 is in reverse position, the sloping surface 54 is offset from the neutral position, as shown, so that a material movement of the plate 52 is necessary before the shift to reverse position can be made.

A switch 59 is mounted in proximity to the shift rods 16, as illustrated in Fig. 4, to be actuated by an arm 60 when a shift rod is in low speed position and to be actuated in the opposite direction when the arm 59 on the adjacent shift rod is in second speed position, the purpose of which will be explained hereinafter.

Referring again to Fig. 1, I have illustrated an electrically actuated device 61 which is employed for controlling the throttle of the carburetor 11 for regulating the speed of the engine during the actuation of the gear shifting device. A pair of solenoids 62 and 63 are positioned in opposite spaced relation on either side of an armature 64 which may be actuated by either of the solenoids for effecting its movement to the right and left therebetween. An arm 65 is provided on the armature shaft which is connected by a link 66 to the throttle of the carburetor for transferring the motion of the armature directly to the throttle for regulating the delivery of fuel to the engine.

Referring to Fig. 5 I have shown a wiring diagram illustrating a system of connection which I prefer to employ with my shifting structure. The vehicle battery 71 has one terminal connected to ground and the other terminal connected to the instrument board by a conductor 72 in the conventional manner. A conductor 73 connects the battery to the switch 58, which is illustrated in Fig. 5 as being disposed in such manner as to be actuated to open position when the shift lever is moved to reverse position to completely cut out the entire gear shift control circuit. A conductor 74 connects the line from the cutout switch 58 to the switch 46 from which a conductor 75 extends to the switch 38 which is connected by a conductor 76 to the motor 22 and magnet 62, the other terminals of which are connected to ground. In like manner a conductor 77 is connected to the switch 47 from which a conductor 78 leads to the switch 43 through the switch 59 from which conductors 79 lead to the reversing terminal of the motor 22 and to the solenoid 63 and to ground. A conductor 80 connects one terminal of the switch 59 to the conductor 76 for a purpose which will be explained hereinafter.

The operation of the device so far described will now be explained. Assume the shift lever 21 to be in neutral position and the engine started, the vehicle is operated by first pushing in on the clutch pedal 15 and moving the shift lever 21 to the left and to the rear to move a gear forwardly into low speed meshed relation with a driving gear. In low position the switch 59 is actuated to connect the circuit 80 to the circuit 76 so that, when an increase in suction pressure occurs in the intake manifold 12, through the building up of inertia in the moving vehicle and reducing the load on the engine, the switch 43 is actuated to energize the circuit 76 through the switch 59 to operate the motor 22 in a direction to move the shift lever from low toward second speed position.

The sloping surface 53 of the plate 54 prevents the lever from being shifted to reverse position and directs the lever through the neutral position across to right hand position into second speed position. The switch 59 is so constructed as to be retained in contact during substantially the entire movement of the change of gears from low to second speed at the very end of which the contact is broken and the circuit completed from the switch 43 through the circuit 79 by the engagement of the arm 50 with the arm of the switch 59.

It is to be understood that when the shift rod 16, which controls the second and high speeds, is in neutral position, the switches 46 and 47 are in closed circuit position and that as the shift rod is moved into second speed position the switch 46 is actuated to open circuit position to prevent the engagement of the motor in a direction from third to second speed position when operating in second speed position.

Thereafter the vehicle will operate at second speed until such time as the suction force of the engine has increased above a predetermined amount, owing to the further increase in inertia in the movement of the vehicle which again reduces the load on the engine, to again actuate the rod 39 for effecting the closing of the switch 43 for completing the circuit 79 through the switches 47 and 59 to the motor 22 for actuating the motor in the opposite direction, because of the reverse connection of the circuit 79 therewith, to move the shift lever in the opposite direction to shift the gears from second to high speed position. Owing to the straight line movement from second to high speed position and the straight pull on the link 28, there will be no chance of the shift lever crossing over, to move into low instead of high speed position. At the end of the shifting operation the switch 47 is open and the motor 22 immediately stops and the switch 46 moves to closed position.

When the tractive load on the vehicle is such that the engine power is decreased to such an extent that the suction force on the intake manifold 12 has been reduced below a predetermined value the pressure within the bellows 34 is reduced and the spring 37 actuates the rod 30 to have the arm 36 thereof close the switch 38 to thereby complete a circuit to the motor to operate the motor in the opposite direction from that which it had previously been operated to thereby actuate the shift rod in the opposite direction and shift the gears from third or high speed position to second or intermediate speed position. At the end of the shifting operation the switch 46 is open and the motor 22 immediately stops after the switch 47 has been moved to closed circuit position.

It is to be understood that after each of the operations of the rods 30 and 39 that opposite change of suction condition obtains within the intake manifold 12 which permits the springs 37 and 41 to move the rods to their opposite positions. That is to say, that after the engine has effected an increase in the suction pressure within the intake manifold 12, the rod 39 is moved to the left against the bias of the spring 41 to complete the circuit through the switch 43 for effecting the shifting of the gears from second to high speed. Thereafter, the suction force is immediately reduced, owing to the increased loading of the engine, which permits the preponderance of the bias of the spring 41 to move the rod 39 to the right to open the circuit through the switch 43. In like manner the pressure within the bellows 34 is decreased by the increased suction of the manifold after the shift from high to second speed position has been effected and the increased outer pressure on the bellows moves the rod 30 to the right against the bias of the spring 37 to open the circuit through the switch 38.

As pointed out hereinabove the rods 30 and 39 are provided with racks 44 which engage gear trains 45 the purpose of which will now be explained. In order to regulate the actuation of the rods 30 and 39 to require a predetermined pull on the rod to actuate them in either direction and at the same time to effect a drag thereto which is inversely proportional to the pull for effecting the actuation of the rod, I provide a train of gears in engagement with each of the racks. The gears act in the nature of balancing or governing means for controlling the movement of the rods. In other words, the intermittent changes in suction pressure in the intake manifold 12, effected by the actuation of the throttle, would not affect the movement of the rods 30 and 39 because of the train of gears 45 in mesh with the racks. It is only in the presence of a constant pull of predetermined amount, effected by either increased or decreased suction, that will cause one of the rods to be actuated to throw either of the switches 43 or 38 depending upon whether the change is one greater or less than the normal intake pressure. In like manner, after either of the switches have been actuated to closed position the gears prevent the immediate opening of the switch contacts when the engine power is built up because of the release of the clutch and thereby holds the circuit completed until the gears have been shifted and a circuit to the motor disconnected through the actuation of one of the switches 46 or 47. Other means besides the gear train, such as escapement elements or suction or pressure dash pots, may be utilized for effecting the same shifting control of the rods 30 and 39.

Referring to the wiring diagram of Fig. 5, it will be noted that the control magnet 62 is connected in parallel relation to the motor 22 when the motor is to be energized to shift the gears from third to second or intermediate speed position. When changing from third to second speed it is necessary to increase the speed of the engine in order to have the gears run in synchronism to permit their shifting from third to second speed. The actuation of the magnet 62 to pull the armature to the left as viewed in Fig. 1 effects the increased feeding of fuel into the intake. In like manner the solenoid 63 is connected in parallel circuit relation to the motor 22 when the motor is operated in the opposite direction to shift the gears from second to high speed position in which arrangement the engine is to be throttled down. This will be effected by the energization of the solenoid 63 for moving the armature 64 in the opposite direction or, as viewed in Fig. 1, to the right, for cutting down the supply of fuel to the intake manifold. It is to be understood that when the gears are synchronized to be in meshed relation during the shifting operation, as employed in the latest present day structure, the solenoids 62 and 63 controlling the throttle, may be dispensed with.

The structure hereinbefore described and illustrated is intended to be built into an automotive vehicle engine and transmission at the time of their structure. It is to be understood that similar constructions may be utilized as an accessory which may be attached to present day vehicles for effecting the shift from low to second and from second to third speed positions and intermittently between third and second speeds, by actuating the manual operable shifting lever in substantially the above described manner.

Referring to Fig. 6, I have illustrated the motor 22 mounted in a housing 81 having its gear 23 in mesh with a gear 24 from which a rod 82 is connected to the upper end of the shift lever 21 through the medium of a ball joint 83 which is attachable to the lever. In like manner a rod 84 extends downwardly from the pivot 26 of the gear through the connection 85 to the end of an arm 86 provided on the end of the clutch lever 15. The connection 85 may be of any well known type such as a slot and pin connection which permits the lower end of the rod 84 to be moved independent of the upper end thereof. Switches 46 and 47 are attached to the transmission casing with the arms 89 thereof in the path of movement of the shift rods 16, the ends of which may be provided with adjustable elements which actuate the arms in the same manner as the arms 48 and 49 actuate the switches. In like manner the throttle actuation solenoids 62 and 63 may be provided on the carburetor for operating an armature 64 for controlling the throttle at the time of the shift, as specified hereinabove.

While the bellows arrangement above referred to and illustrated in Fig. 1, is utilized for actuating the switches 38 and 43 for controlling the circuit to the motor 22, I have illustrated, in Fig. 6, a piston 91 which may be actuated to control the movement of a contact 92 for completing a circuit to the conductor 76 or 79 as the case may be, all of which may be substituted for the bellows construction. The cylinder 93 is provided within the housing 81 to which a connecting tube 94 leads to the intake manifold 12, to be connected thereto in a well known manner. Rearwardly of the plunger 91 a spring 95 is provided for biasing the plunger forwardly or to the left, as viewed in the figure, when the suction pressure in the intake manifold and the tube 94, has been reduced below a predetermined value, shifting the contact 92 to complete a circuit through a contact 96 which functions as the switch 38 for energizing the motor in a direction to shift from high to second speed.

The chamber in the cylinder forwardly of the piston, functions as a dash pot for regulating the movement of the piston relative to both an increased and decreased pressure on the rearward end thereof. When the piston is urged to the left, the air trapped ahead of the cylinder opposes the movement while, when urged to the right, a suction force is established which likewise opposes the movement. The movement of the piston relative to the intensity and duration of the actuating force is regulated by the flow of air into or from the chamber which may be controlled by suitable means well known in the art.

In like manner when the motor has increased in power over the tractive load, to increase the suction pressure within the manifold 12, the piston will be actuated rearwardly or to the right, as viewed in the figure, against the bias of the spring 95 to complete a circuit to a contact 97 which functions as the switch 43 to energize the circuit 79 to operate the motor in the opposite direction for changing the gears from second to high speed. When desired, switches 58 and 59 may be added to the gear shift box along with the bias plunger and plate 52 to effect the complete shifting of the gears from low through second to high speed positions by the attached structure.

It is to be understood that in either construction at the time of each change of gears from first to second and from second to high speed positions, the clutch is first released through the medium of the rod 31 or 84 and after the shifting has been completed the rod is returned to normal position because of its off center relation with the gear. In either arrangement the clutch pedal 15 may be actuated independent of the rods 31 and 84, in the case of the former through the bifurcation of the end of the rod and of the latter through the connection 85 which permits the downward movement of the lower portion of the rod independent of the upper portion thereof.

It is to be understood that the piston and cylinder arrangement, controlling the reversing switches 92 may be utilized in place of the bellows 34 and 35 for actuating the structure illustrated in Figs. 1 to 4 inclusive, or that the bellows structure may be substituted for the piston and cylinder construction employed on the device illustrated in Fig. 6.

To permit the operation of the clutch 13 before the gears are shifted, I employ a loose connection between the gear 24 and the shift lever 21 which may be incorporated in the rods 28 and 82 to permit the gear to be initially operated without moving the lever. In the drawings I have illustrated a slot 98 provided in the gear 24 in which the pivot 27 is slidable. Springs 99 are provided on each side of the pivot for centering it in the slot and for permitting the gear to move relative to the pivot and the shift lever, for operating the clutch before the lever is moved.

While I have described and illustrated but two embodiments of my invention, it will be apparent to those skilled in the art that various changes, omissions, additions and substitutions may be made therein without departing from the spirit and scope of my invention, as set forth in the accompanying claims.

I claim as my invention:

1. As an attachment for an automotive vehicle, a shifting device engageable with the shift lever of said vehicle, and means for controlling the operation of said device for predeterminedly shifting said lever in accordance with predetermined variations between the engine load and the tractive load of the vehicle.

2. As an attachment for an automotive vehicle, a shifting device engageable with the shift lever of the vehicle, means for controlling the operation of the device for predeterminedly shifting said lever in accordance with predetermined variations between the engine power and the tractive load of the vehicle, and means interconnecting the clutch of said vehicle with said shifting device for effecting its actuation at the time of each shifting operation.

3. As an attachment for an automotive vehicle, a shifting device engageable with the shift lever of said vehicle, means for controlling the operation of said device for predeterminedly shifting said lever in accordance with predetermined variations between the engine power and the tractive load of the vehicle, means interconnecting the clutch of said vehicle with said shifting device for effecting its release before each shifting operation, and means for controlling the engine throttle in accordance with the direction of said shift.

4. A transmission mechanism for changing the speed of operation of a driven vehicle relative to the engine power including, in combination, motor means for effecting the speed change, a clutch, interconnecting means between said motor means and said clutch for effecting its actuation before each change in speed, and means for energizing said motor in accordance with the suction pressure in the intake manifold of the engine.

5. A transmission mechanism for changing the speed of operation of a driven vehicle relative to the engine including, in combination, motor means for actuating the mechanism, a clutch, interconnecting means between said motor means and said clutch for effecting its operation before each actuation of the mechanism, means for energizing said motor in accordance with the suction pressure in the intake manifold of the engine, and means for controlling the actuation of the energizing means in inverse time relation to the change in the suction force.

6. A transmission mechanism for an automotive vehicle for changing the speed of operation of the driven means relative to the power of the engine including, in combination, a motor, a device actuated by said motor for effecting a speed change in said mechanism, a clutch, interconnecting means between said device and clutch for effecting its operation before each change in speed, and means for energizing the motor in accordance with changes in the suction pressure in the intake manifold of the engine.

7. A transmission mechanism for changing the speed of operation of the driven means relative to the speed of the engine including, in combination, a motor, a device actuated by said motor which is connected to the shift lever of the mechanism, a clutch, interconnecting means between said device and said clutch for effecting its operation before each movement of the shift lever, means for energizing the motor in accordance with the suction pressure in the intake manifold of the engine, and means controlling the actuation of the energizing means in inverse time relation to the change in the suction force effective in both directions of movement of the energizing means.

8. A transmission mechanism for changing the speed of operation of the driven means relative to the speed of the engine including, in combination, a motor, a device actuated by said motor which is connected to the shift lever of said mechanism, a clutch, interconnecting means between said device and said clutch for effecting its operation before each movement of the shift lever, means for energizing the motor in accordance with the suction pressure in the intake manifold of the engine, and means for controlling the throttle of the engine in accordance with the direction of the movement of the shift lever.

9. A transmission mechanism provided with motor means for shifting the mechanism through a range of speeds both upwardly and downwardly and for actuating the clutch before each shift operation including, in combination, means associated with the intake manifold of the engine for controlling the actuation of the shift means in accordance with changes in suction pressure therein.

10. A transmission mechanism provided with motor means for shifting the mechanism through a range of speeds both upwardly and downwardly and for actuating the clutch before each shift operation including, in combination, means associated with the intake manifold of the engine for controlling the actuation of the shift means in accordance with changes in the suction pressure therein, and means for controlling the actuation of the energizing means in inverse time relation to the change in the suction pressure.

11. A transmission mechanism provided with motor means for shifting the mechanism through a range of speeds both upwardly and downwardly and for actuating the clutch before each shift operation including, in combination, means associated with the intake manifold of the engine for controlling the actuation of the shift means in accordance with changes in the suction pressure therein, said means including flexible, bellows-like elements which are connected to the intake manifold, one of which is actuated by an increase in suction pressure for energizing the shifting means for effecting a shift in one direction while the other bellows is actuated by a decrease in suction pressure for energizing the shifting means for effecting a shift in the opposite direction, for changing the speed ratio upwardly or downwardly in accordance with the variations between the tractive load of the vehicle and the engine power.

12. A transmission mechanism provided with motor means for shifting the mechanism through a range of speeds both upwardly and downwardly and for actuating the clutch before each shift operation including, in combination, means associated with the intake manifold of the engine for controlling the actuation of the shift means in accordance with changes in the suction pressure therein, said means including flexible, bellows-like elements which are connected to the intake manifold, one of which is actuated by a decrease in suction pressure for energizing the shifting means for effecting a shift in one direction while the other bellows is actuated by an increase in suction pressure for energizing the shifting means for effecting a shift in the opposite direction for changing the speed ratio upwardly or downwardly in accordance with the variations between the tractive load of the vehicle and the engine power, and means for controlling the actuation of the energizing means in inverse time relation to the change in the suction force.

MAURICE A. LACEY.